(12) United States Patent
Okanda et al.

(10) Patent No.: US 6,896,308 B2
(45) Date of Patent: May 24, 2005

(54) VEHICLE STORAGE BOX STRUCTURE

(75) Inventors: Toru Okanda, Hachioji (JP); Tooru Ishii, Isehara (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/833,005

(22) Filed: Apr. 28, 2004

(65) Prior Publication Data
US 2004/0227371 A1 Nov. 18, 2004

(30) Foreign Application Priority Data
May 16, 2003 (JP) ........................................ 2003-138550

(51) Int. Cl.[7] ............................................... B60R 5/00
(52) U.S. Cl. .............................. 296/37.12; 296/187.05; 296/70; 280/752
(58) Field of Search ............................ 296/24.3, 24.34, 296/187.05, 193.02, 37.1, 37.8, 37.12, 70, 72, 73; 280/751, 752

(56) References Cited

U.S. PATENT DOCUMENTS

| | | | | | |
|---|---|---|---|---|---|
| 4,596,416 | A | * | 6/1986 | Muller .................... | 296/37.12 |
| 5,071,162 | A | * | 12/1991 | Takagawa .................. | 280/752 |
| 5,476,283 | A | * | 12/1995 | Elton ........................ | 280/753 |
| 5,482,319 | A | * | 1/1996 | Yoshimura et al. ......... | 280/752 |
| 5,558,385 | A | * | 9/1996 | Gross et al. .............. | 296/37.12 |
| 5,842,736 | A | * | 12/1998 | Hung ..................... | 296/187.05 |
| 5,971,463 | A | * | 10/1999 | Nowak et al. ............. | 296/37.8 |
| 6,050,628 | A | * | 4/2000 | Allison et al. ............. | 296/37.12 |
| 6,131,242 | A | * | 10/2000 | Zipperle et al. ................ | 16/82 |
| 6,196,588 | B1 | * | 3/2001 | Sugawara ..................... | 280/779 |
| 6,299,208 | B1 | * | 10/2001 | Kasahara et al. ............ | 280/752 |
| 2004/0041385 | A1 | * | 3/2004 | Garnweidner et al. ...... | 280/752 |
| 2004/0124623 | A1 | * | 7/2004 | Yamazaki .................... | 280/752 |
| 2004/0140685 | A1 | * | 7/2004 | Bieck et al. .............. | 296/37.12 |

FOREIGN PATENT DOCUMENTS

JP          2002-187488 A         7/2002

* cited by examiner

*Primary Examiner*—Patricia L. Engle
(74) *Attorney, Agent, or Firm*—Shinjyu Global IP Counselors, LLP

(57) ABSTRACT

A vehicle storage box mounting structure is configured to reduce the discomfort felt by the passenger when the passenger's knees hit the storage box during a front collision without significantly reducing the strength and rigidity of the slide rails overall. The vehicle storage box mounting structure serves to mount a storage box to a vehicle in such a manner that the storage box can be moved between two positions, a stored position and a pulled out position, by slide rails provided on both sides of the storage box. The vehicle storage box mounting structure is configured such that at least a portion of the slide rails can be made to swing in response to an input force to the storage box from a passenger during a front collision.

12 Claims, 5 Drawing Sheets

VEHICLE STORAGE BOX STRUCTURE

BACKGROUND OF THE INVENTION

1. Field of the Invention

The present invention generally relates to a mounting structure for a vehicle-use storage box, e.g., a sliding glove box. More specifically, the present invention relates to a vehicle-use storage box structure having slide rails that are arranged in an area where the passenger's knee(s) may likely contact one of slide rails during a front collision.

2. Background Information

Known vehicle storage box mounting structures include the mounting structure of the sliding glove box. The sliding glove box has slide rails arranged on the left and right sides of the glove box main body. A vehicle body panel exists to the front of the slide rails and the lid of the glove box or the instrument panel exists to the rear of the slide rails. In order to achieve the longest possible slide distance, the full length of the slide rails is set be as long as possible within the space between the vehicle body panel and the glove box lid. (See Japanese Laid-Open Patent Publication No. 2002-187488.

In view of the above, it will be apparent to those skilled in the art from this disclosure that there exists a need for an improved mounting structure for a vehicle-use storage box. This invention addresses this need in the art as well as other needs, which will become apparent to those skilled in the art from this disclosure.

SUMMARY OF THE INVENTION

It has been discovered that during a front collision, the passenger's knees will sometimes penetrate the instrument panel. When this occurs, there is the possibility that the passenger will experience increased discomfort if the passenger's knees hits the slide rails, which are made of iron or other high-hardness material. In particular, the slide rails are arranged in the area where the passenger's knee(s) may likely contact one of slide rails during a front collision.

One method of resolving this problem is to make the slide rails with a thin-walled structure to reduce the overall strength of the slide rails and soften the reaction force that occurs when a knee contacts a slide rail. However, secondary problems are unavoidable with such a solution. For example, one can easily imagine a situation in which a heavy object is stored in the glove box and the slide rails are damaged because they cannot tolerate the downward load. Also, since the rigidity of the main body of the slide rails is reduced, the glove box will feel flimsy when it is opened and closed. Moreover, since the rigidity of the main body of the slide rails is reduced, the glove box will readily shake due to the vibrations of the vehicle when it is open. In short, the quality of the glove box in relation to opening and closing will decline, if the slide rails are constructed with a thin wall walled structure.

The object of the present invention is to solve the problems just described by providing a vehicle storage box mounting structure that reduces the discomfort felt by the passenger when the passenger's knees penetrate or hit the storage box during a front collision without significantly reducing the strength and rigidity of the slide rails overall.

In order to achieve this object of the present the invention, a vehicle storage box structure is provided that basically comprises a storage box, a slide mechanism and a vehicle mounting arrangement. The slide mechanism is mounted to the storage box in such a manner that the storage box can be moved between a stored position and a pulled out position. The vehicle mounting arrangement is provided on the slide mechanism. The vehicle mounting arrangement is configured and arranged such that at least a rear portion of the slide mechanism move from a normal operating position to a retracted position where the rear portion of the slide mechanism is outside of a passenger penetration area in response to an impact force to the storage box from a passenger.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
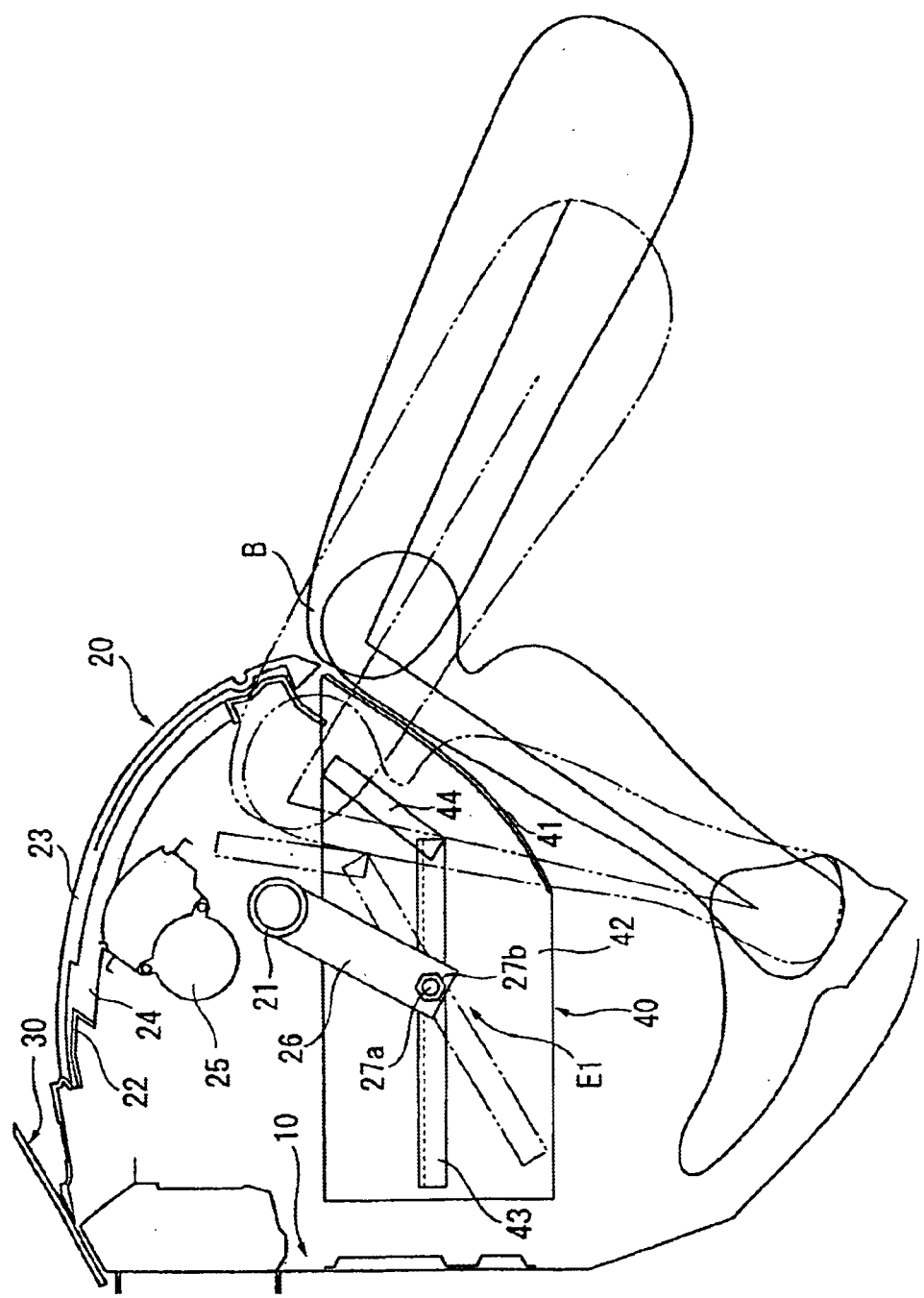
FIG. 1 is a simplified schematic cross sectional view of a vehicle storage box structure in accordance with a first embodiment of the present invention.
Figure 2:
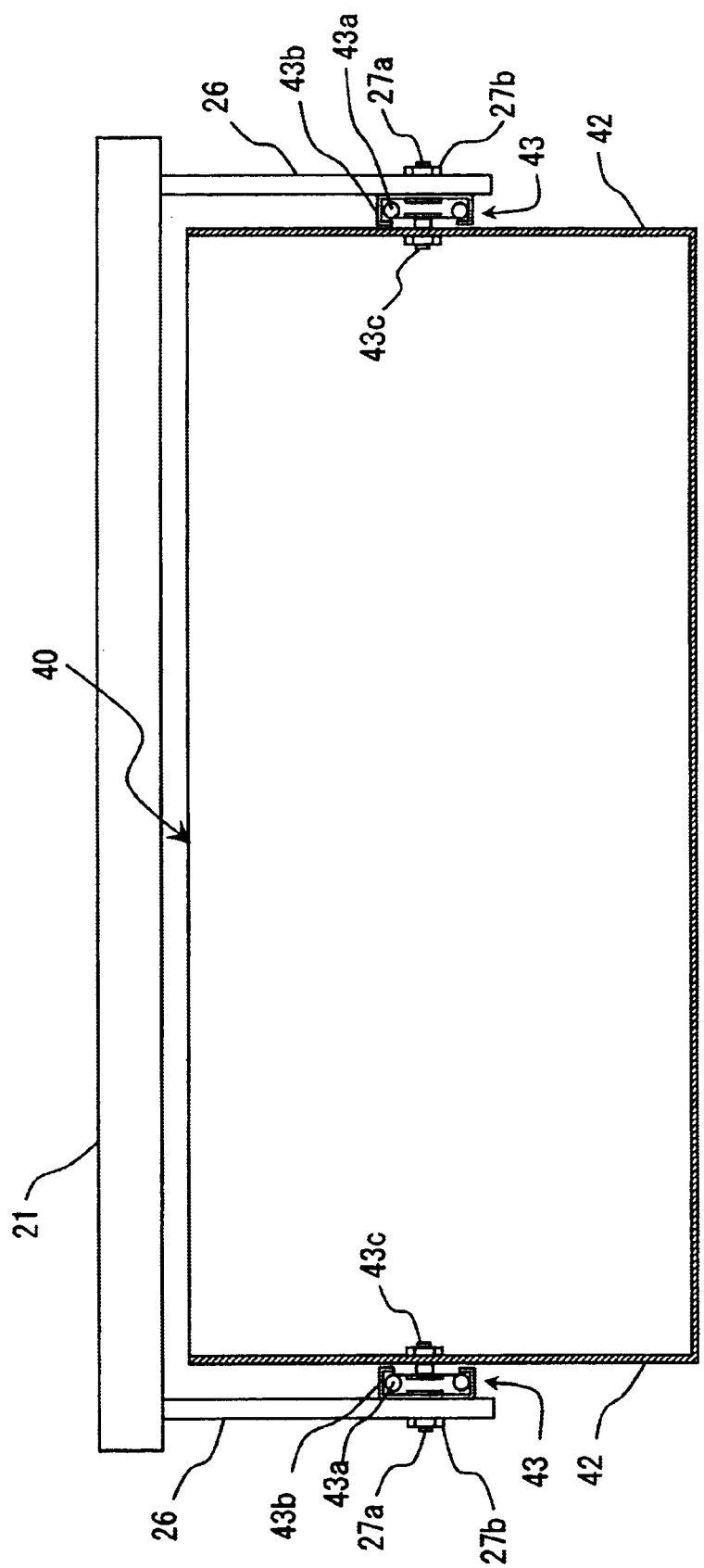
FIG. 2 is a simplified transverse cross sectional view of the vehicle storage box structure shown in FIG. 1 in accordance with the first embodiment of the present invention.
Figure 3:
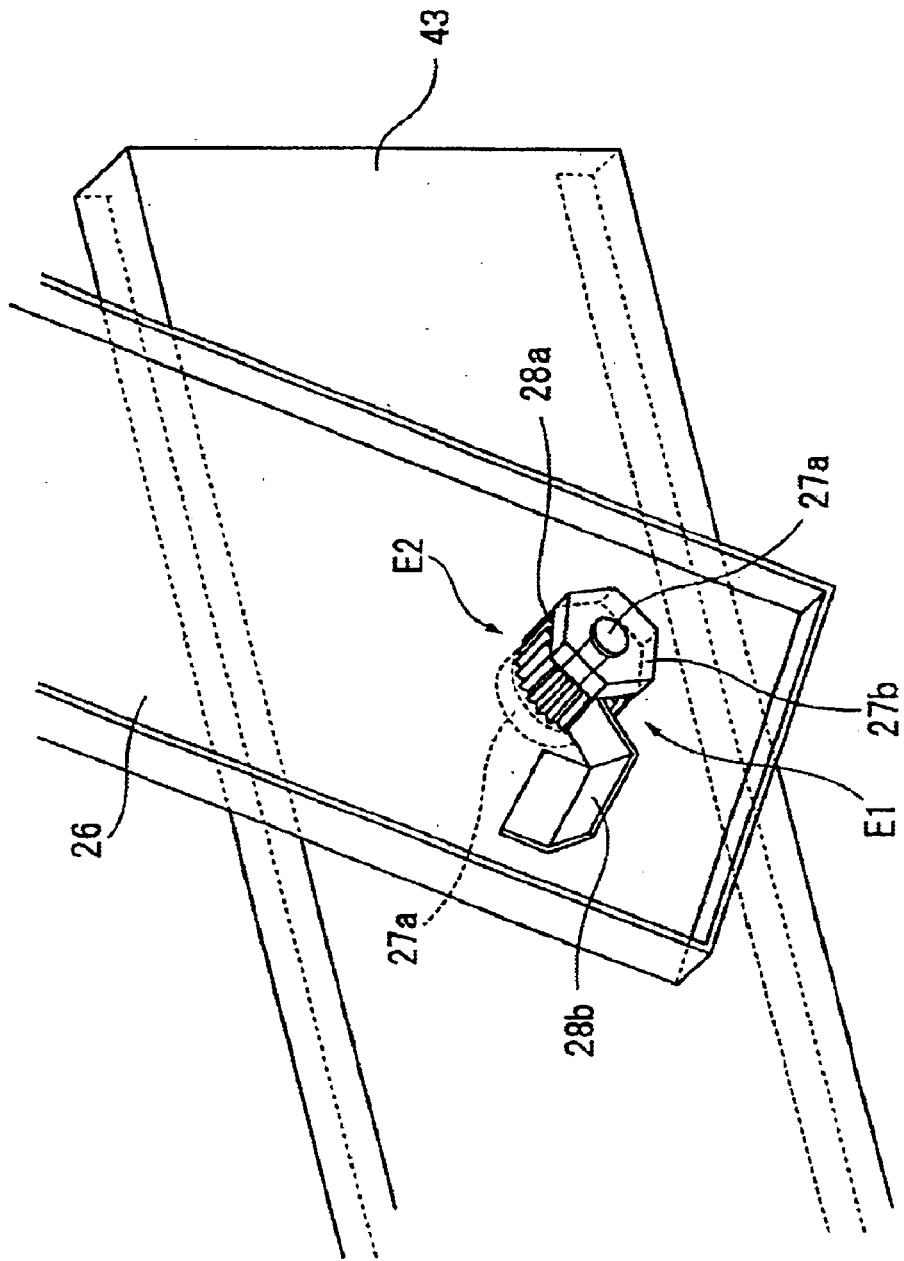
FIG. 3 is an enlarged simplified perspective view of selected main mounting components of the vehicle storage box structure shown in FIGS. 1 and 2 in accordance with the first embodiment of the present invention.

Referring initially to FIGS. 1–3, a vehicle storage box mounting structure is illustrated in accordance with a first embodiment of the present invention. The vehicle storage box can be located anywhere in the cabin, e.g., in the front, rear, side, middle, or anywhere else where it faces opposite a passenger. These embodiments will be described using the case of a glove box 40 that is located build into an instrument panel 20 in the front of the vehicle as a representative example. As described below, with a vehicle storage box mounting structure according to the present invention, it is not necessary to make the wall-thickness of the slide rails 43 thin. Consequently, great reductions in the strength and rigidity of the slide rails overall can be avoided. Furthermore, even if the passenger's knees penetrate the glove or storage box 40 during a front collision, the discomfort felt by the passenger will be small because at least a portion of the slide rails will swing so that the slide rails are outside the penetration area, as discussed below.

In the figures, a vehicle body panel 10, i.e., the dash panel, has a windshield glass 30 arranged above the dash panel 10. The dash panel 10 constitutes a portion of the vehicle. The instrument panel 20 is located rearward of the dash panel 10, and is supported on and fixed to a steering member 21 that runs in the transverse direction of the vehicle. The instrument panel 20 comprises a metal shell panel 22 that makes up most of the outside shape of the instrument panel 20 and a pad 23 that covers the upper surface of the shell panel 22. An airbag device 25 is arranged so as to face a hole 24 provided in the shell panel 22.

The glove box 40 (storage box) has a slide mechanism mounted to the glove box 40 in such a manner that the glove box 40 can be moved between a stored position and a pulled out position. The slide mechanism includes a pair of slide rails 43 with each of the slide rails 43 having an inner rail 43*a* and an outer rail 43*b* having the inner rail 43*a* slideable retained thereon. The inner rails 43*c* are fixedly coupled to the glove box 40 by a plurality of fasteners 43*c*. The intermediate portions of the outer rails 43*b* are fastened to the tip ends of a pair of diagonally-hanging brackets 26 by a pair of bolts 27*a* and a pair of nuts 27*b*. The glove box 40 is suspended with a space between the glove box 40 and the steering member 21 and has a swing axis oriented in the transverse direction of the vehicle. In this embodiment, the outer rails 43*b*, the hanging brackets 26, the bolts 27*a* and the nuts 27*b* constitute a vehicle mounting arrangement that is provided on the slide mechanism and functions to support the glove box 40 to the steering member 21 in a swinging manner.

The glove box 40 (storage box) is shaped like a box having an open top and a rear wall 41 that curves downward and forward in a slightly bulged manner so as to provide extra space below the passenger's knees. The slide rails 43 oriented in the longitudinal direction of the vehicle are attached to both transversely facing sides, i.e., to the outside surfaces of the side walls 42, of the glove box 40. The storage box 40 is mounted to the vehicle in such a manner that it can be moved between two positions: the stored position shown in the figures and a pulled out position for removing stored articles. Knee protection plates 44 are fixed to side walls 42 and the rearward ends of the slide rails 43 for preventing contact of the passenger B (e.g., the knees or shins of the passenger B) with the slide rails 43.

The brackets 26 and the slide rails 43 form an energy absorbing arrangement E1 by being fastened together with the bolts 27*a* and the nuts 27*b* as explained below. Thus, the slide rails 43 are mounted to the vehicle through the brackets 26 in such a manner that at least a portion of each of the slide rails 43 (the entire slide rail 43 in this embodiment) can swing about an axis perpendicular to the direction of an impact force from a passenger B and the energy absorbing arrangement E1 absorbs the energy resulting from the impact force by the friction between the contacting surfaces. Basically, the bolts 27*a* and the nuts 27*b* are configured and arranged to be tightened such that the slide rails 43 are normally retained in substantially horizontal orientation to move from the normal operating position to the normal retracted position. However, the bolts 27*a* and the nuts 27*b* are further configured and arranged such that the slide rails 43 rotate together with the glove box 40 as shown in the phantom lines in response to an impact force to the storage box from a passenger.

In particular, when the body of the passenger B penetrates the rear wall 41 of the glove box 40 due to a collision or the like, at least rear portions of the slide rails 43 swing upwardly, and are put in positions outside the penetration area of the body of the passenger B so that contact between the slide rails 43 and the body, e.g., knees, of the passenger B is prevented. Of course, the slide rails 43 can be supported so that the glove box 40 and the slide rails 43 swing downwardly by reversing the illustrated arrangement.

FIG. 2 shows an auxiliary energy absorbing arrangement E2. The auxiliary energy absorbing arrangement E2 is a latch mechanism provided on the energy absorbing arrangement E1 and is constructed of a latch toothed wheel 28*a* that is fastened with the nut 27*b* to the portion of the bolt 27*a* that protrudes from the bracket 26 after it is passed through the slide rail 43 and the bracket 26 and a spring-like latch piece 28*b* that is fixed to the bracket 26 and engages with the latch toothed wheel 28*a*. The auxiliary energy absorbing arrangement E2 is configured such that the input energy is absorbed each time the latch piece 28*b* moves to the next tooth of the latch toothed wheel 28*a*.

Second Embodiment

Figure 4:
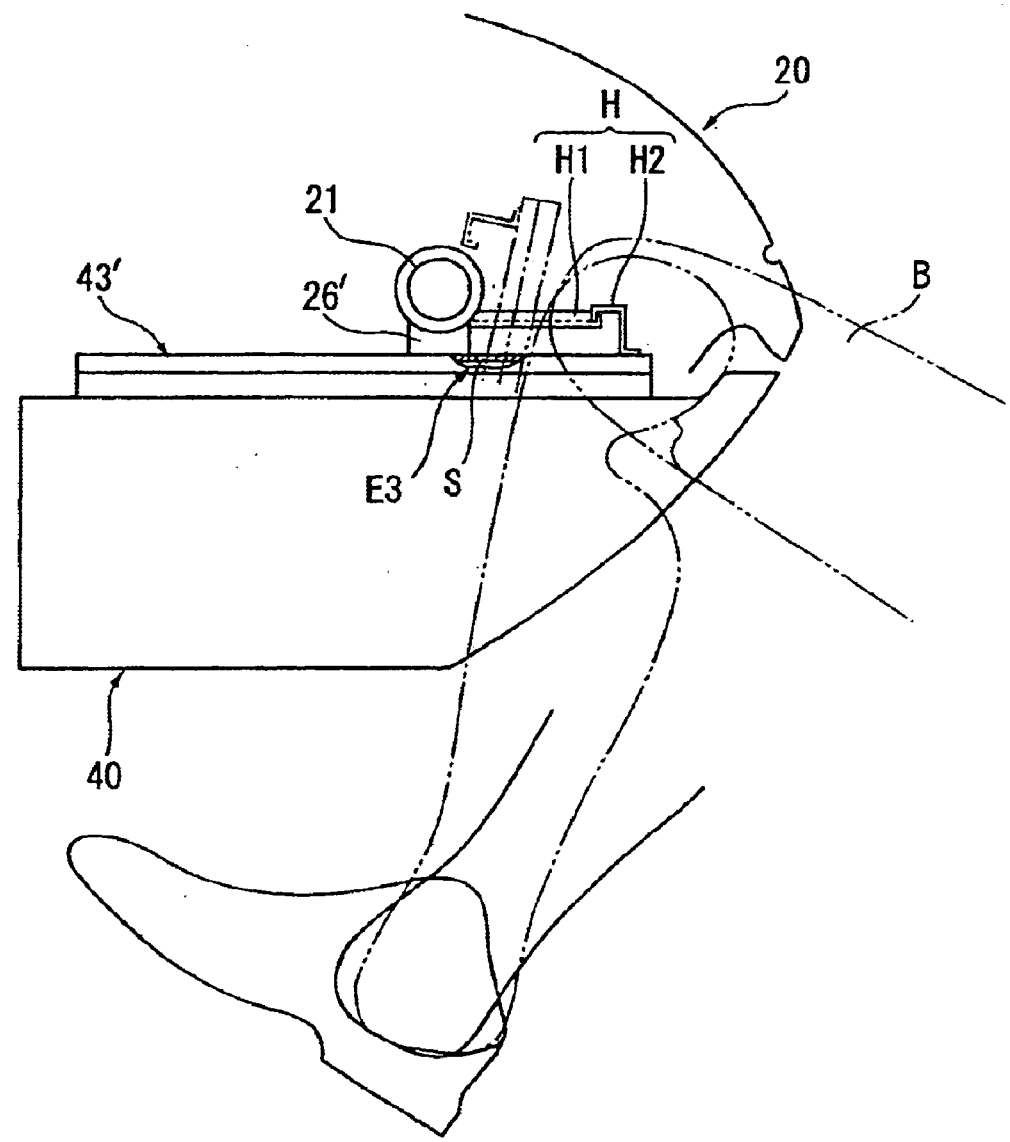
FIG. 4 is a simplified schematic cross sectional view of a vehicle storage box structure in accordance with a second embodiment of the present invention.
Figure 5:
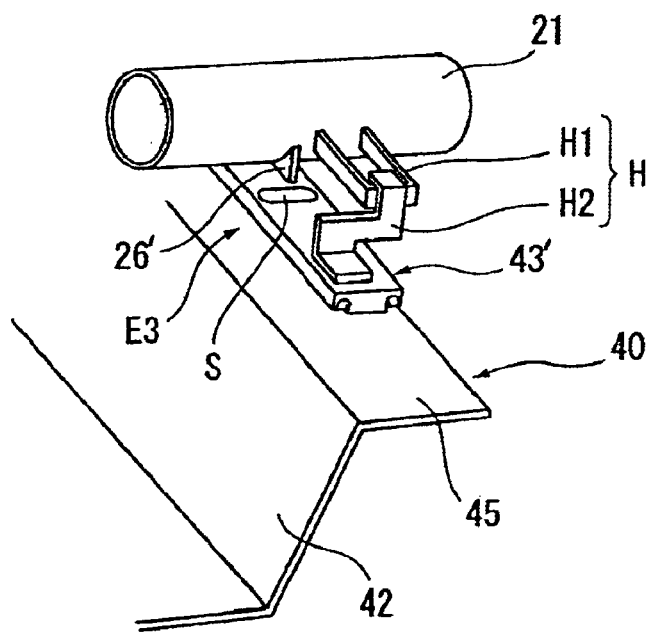
FIG. 5 is an enlarged simplified perspective view of the main mounting components of the vehicle storage box structure shown in FIG. 4 in accordance with the second embodiment of the present invention.

Referring now to FIGS. 4 and 5, a vehicle storage box mounting structure is illustrated with another vehicle mounting arrangement having an energy absorbing arrangement E3 in accordance with a second embodiment. In view of the similarity between the first and second embodiments, the descriptions of the parts of the second embodiment that are identical to the parts of the first embodiment may be omitted for the sake of brevity. Moreover, the parts of the second embodiment that are the same as the first embodiment will be given the same reference numeral, while the parts that differ from the parts of the first embodiment will be indicated with a single prime (').

In this second embodiment, the slide rails 43 of the first embodiment have been replaced with a pair of slide rails 43' (slide mechanism) and the brackets 26 have been replaced with a pair of shorter brackets 26'. The slide rails 43' of the slide mechanism are mirror images of each other. Thus, only one the slide rails 43' is illustrated. Also, similar to the first embodiment, the slide rails 43' each includes an inner rail attached to the glove box 40 and an outer rail attached to one of the brackets 26'. This embodiment is the same as the first embodiment in that the slide rails 43' are mounted to the vehicle (to the steering member 21 in this embodiment) through the brackets 26' in such a manner that the slide rails 43' can slide generally horizontally in the longitudinal direction of the vehicle. However, as shown in FIG. 4, this embodiment is different in that the inner rails of the slide rails 43' are fixed to the upper surface flanges 45 provided on the upper edges of the side walls 42 of the glove box 40.

Moreover in this embodiment, the vehicle mounting arrangement includes the bracket members 26' that mount the slide rails 43' to the vehicle, and a pair of fold assisting structures S provided on portions of the slide rails 43' that are disposed closer to the impact force side than the brackets 26' such that an energy absorbing arrangement E3 is attained by utilizing the fold resistance force of the slide rails 43'.

Thus, the energy absorbing arrangement E3 includes the fold assisting structures S that are provided on portions of each of the slide rails 43'. The fold assisting structure S is located on the portions of each of the slide rails 43' that are closer to the impact side than the bracket 26'. Thus, the energy absorbing arrangement E3 utilizes the fold resistance force of the slide rail 43'. The fold assisting structures S are provided on either the outer or inner rails, whichever is fixed to the bracket 26', at a position rearward of the position where the rail is attached to the bracket 26'. In the illustrated embodiment, the fold assisting structures S are provided on the outer rails. The fold assisting structure S comprises a point of weakening such as a groove, a slit, a notch, a depression, or other feature that will serve as a starting position for the rail to fold upward about an axis oriented in the traverse direction of the vehicle. After the slide rail 43' begins folding/swinging from the prescribed position due to the fold assisting structure S, the slide rail 43' will fold upward while at the same time absorbing energy.

When such fold assisting structures S are provided, there is the possibility that the slide rails 43' will sag down if a heavy object is put into the glove box 40. Therefore, a suspending structure H are provided on the vehicle (on the steering member 21 in this embodiment) to suspend the portion of each slide rail 43' rearward of the portion where the fold assisting structure S is provided. Each suspending structure H comprises a box-shaped arm H1 and a finger H2. The box-shaped arm H1 is fixed to the steering member 43' and extends rearward. The finger H2 is suspended from the box-shaped arm H1 and fixed to the slide rail 43'. The box-shaped arm H1 and the slide rail 43' are offset from each other in the transverse direction of the vehicle so that they will not interfere with each other when the slide rail 43' swings. The finger H2 is hooked onto the box-shaped arm H1. When passenger input occurs due to a collision or the like, the slide rail 43' swings to the position indicated with a double-dot chain line in FIG. 4 without causing the finger H2 and slide rail 43' to contact the box-shaped arm H1. In such a case, the finger H2 disengages directly and the slide rail 43 bends upward while absorbing energy independently.

Third Embodiment

Figure 6:
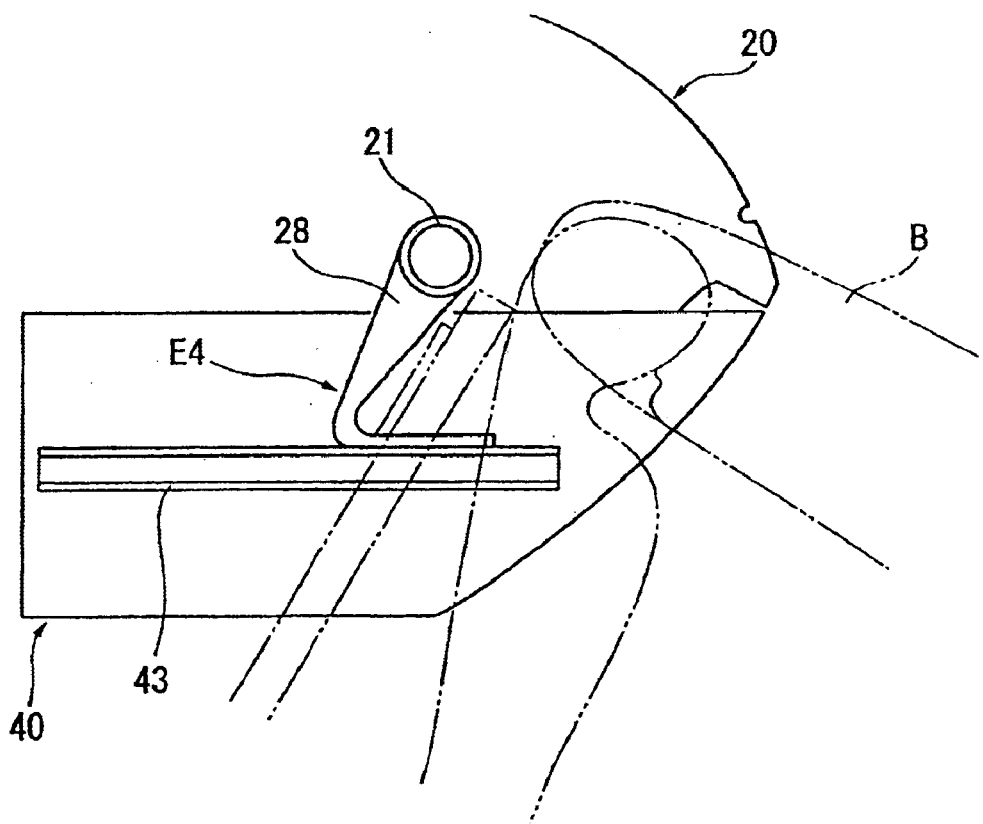
FIG. 6 is a simplified schematic cross sectional view of a vehicle storage box structure in accordance with a third embodiment of the present invention.

Referring now to FIG. 6, a vehicle storage box mounting structure is illustrated with another vehicle mounting arrangement having an energy absorbing arrangement E4 in accordance with a third embodiment. In view of the similarity between the first and third embodiments, the descriptions of the parts of the third embodiment that are identical to the parts of the first embodiment may be omitted for the sake of brevity. Moreover, the parts of the third embodiment that are the same as the first embodiment will be given the same reference numeral.

In this second embodiment, the brackets 26 of the first embodiment have been replaced with a pair of shorter brackets 28. The brackets 28 are identical to each other. Thus, only one the brackets 28 is illustrated. This embodiment is the same as the previous embodiments in that the slide rails 43 are mounted to the vehicle (to the steering member 21 in this embodiment) through brackets 28 in such a manner that the slide rails 43, but the shape of the brackets 28 is different. The brackets 28 are made of, for example, pipe-like members that have been partially squashed, bent into an L-shape or V-shape, and oriented such that the open side of the L or V faces toward the input side, i.e., toward the rear of the vehicle in this embodiment.

Through the brackets 28, the slide rails 43 are mounted to the vehicle, i.e., the steering member 21 in this embodiment. When an input is received from the passenger B or the like, the slide rails 43 mounted to the glove box 40 move to the position indicated by the double-dot chain line as the brackets 28 bend. As a result, when the body of the passenger B penetrates due to a collision or the like, the slide rails 43 are put into positions outside the penetration area so that contact between the slide rails 43 and the body, e.g., knees, of the passenger B is prevented. Thus, in this embodiment, the vehicle mounting arrangement includes the L-or V-shaped bracket members 28 that mount the slide rails 43 to the vehicle, i.e., the steering member 21. The bracket members 28 also functions as the energy absorbing arrangement that is attained by an open side of the L or V shaped bracket members 28 that faces towards a passenger impact force side of the storage box 40.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-138550. The entire disclosure of Japanese Patent Application No. 2003-138550 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle storage box structure comprising:
   a storage box;
   a slide mechanism mounted to the storage box in such a manner that the storage box can be moved between a stored position and a pulled out position; and
   a vehicle mounting arrangement provided on the slide mechanism, the vehicle mounting arrangement being configured and arranged such that at least a rear portion of the slide mechanism moves from a normal operating position to a retracted position where the rear portion of the slide mechanism is outside of a passenger penetration area in response to an impact force to the storage box from a passenger.

2. The vehicle storage box structure as recited in claim 1, wherein
   the slide mechanism includes a pair of slide rails mounted to a pair of laterally spaced areas of the storage box.

3. The vehicle storage box structure as recited in claim 2, wherein
   the vehicle mounting arrangement is configured and arranged to rotate the slide rails out of the passenger penetration area in response to the impact force from the passenger.

4. The vehicle storage box structure as recited in claim 3, wherein
   the vehicle mounting arrangement includes an energy absorbing arrangement that absorbs energy of the impact force from the passenger as the slide rails move to the retracted position.

5. The vehicle storage box structure as recited in claim 2, wherein
the vehicle mounting arrangement includes an energy absorbing arrangement that absorbs energy of the impact force from the passenger as the slide rails move to the retracted position.

6. The vehicle storage box structure as recited in claim 5, wherein
the vehicle mounting arrangement includes a pair of bracket members that mount the slide rails to the vehicle, the slide rails being fastened to the bracket members by bolts and nuts that have axes perpendicular to the direction of the impact force such that the energy absorbing arrangement is attained by surface contact friction between the slide rails and the bracket.

7. The vehicle storage box structure as recited in claim 6, wherein
an auxiliary energy absorbing arrangement comprising at least latch toothed wheel with a plurality of teeth mounted about one of the axes of the bolts and at least one spring-like latch piece arranged to engage the teeth of the latch toothed wheel, the auxiliary energy absorbing arrangement being configured such that the energy of the impact force is absorbed each time the latch piece moves to another one of the teeth of the latch toothed wheel.

8. The vehicle storage box structure as recited in claim 5, wherein
the vehicle mounting arrangement includes a pair of bracket members that mounted the slide rails to the vehicle, and a pair of fold assisting structures provided on portions of the slide rails that are disposed closer to the impact force side than the brackets such that the energy absorbing arrangement is attained by utilizing the fold resistance force of the slide rails.

9. The vehicle storage box structure as recited in claim 8, wherein
the vehicle mounting arrangement includes a suspending structure provided on the slide rails to prevent sagging of the portions of the slide rails where the fold assisting structures are provided.

10. The vehicle storage box structure as recited in claim 5, wherein
the vehicle mounting arrangement includes a pair of bracket members that are configured to mount the slide rails to the vehicle, the energy absorbing arrangement being attained by the bracket members being configured with a bend that opens towards a passenger impact force side of the storage box such that the slide rails swing out of a passenger penetration area in response to the impact force from the passenger.

11. The vehicle storage box structure as recited in claim 10, wherein
the bracket members are generally L-or V-shaped brackets.

12. A vehicle storage box structure comprising:

storage box means for providing a storage area;

sliding means for slideably supporting the storage box means in such a manner that the storage box means can be moved between a stored position and a pulled out position; and vehicle mounting means for mounting the sliding means to a vehicle such that at least a rear portion of the sliding means rotates from a normal operating position to a retracted position where the rear portion of the slide means is outside of a passenger penetration area in response to an impact force to the storage box means from a passenger.

* * * * *